Patented Feb. 27, 1945

2,370,214

UNITED STATES PATENT OFFICE 2,370,214

OPTICAL DEVICE

Victor Walker, Fort Erie, Ontario, Canada, assignor to AlnCin, Inc., Buffalo, N. Y.

No Drawing. Application August 14, 1940,
Serial No. 352,648

3 Claims. (Cl. 41—42)

This invention relates to optical devices and to methods for producing the same, and has particular relation to the provision of improved forms of light transmitting glass devices. One of the objects of the invention is to provide an improved glass light transmitting device of optimum light transmitting capabilities. Another object of the invention is to provide a device of the character described by means of a simplified and economical manufacturing operation. Another object of the invention is to provide an improved optical device capable of modifying light transmitted therethrough into minutely diffused and homogenized beam form without appreciable light transmission losses. Another object of the invention is to provide the device just previously described by means of a simplified manufacturing operation. Another object of the invention is to provide an improved light transmitting glass device having a surface of optimum light transmitting capabilities and relatively free of specular reflection characteristics. Another object of the invention is to provide a device of the character just previously described by means of a simplified manufacturing operation. Other objects and advantages of the invention will appear in the specification herein.

The invention has particular relation to the provision of an improved surface form in connection with glass optical devices which are constructed of glass stock of the types that contain appreciable proportions of barium. Such types of glass are at present employed in connection with the optical industry in large quantities because of their light refraction characteristics, as compared to glasses of the barium free sodium and/or calcium types.

Prior to the present invention these barium containing types of glasses have been ground and polished into final lens form, or the like, by conventional abrasion processes. That is, the stock piece is first molded or otherwise formed roughly into the general form of the lens or other article to be produced, and it is then ground down by successively finer grades of loose abrasive material and ultimately polished by minute abrasives such as rouge, or the like, into the desired contour form. It is well known that these methods require meticulous and laborious operations and can only be successfully accomplished by expert workmen in return for large expenditures of time and expensive procedure.

In accord with the present invention the glass stock base is first molded or blown or ground or shaped or otherwise formed into the desired surface contoured thereof by any suitable method of glass shaping. If a relatively coarse shaping method is employed in this first step of manufacture, a second shaping step may then be applied to provide the surface of the stock piece in the desired form and contour. For example, the second or final shaping step may be performed by a bonded fine grain abrasive wheel having its working surface shaped complementary to the prescribed surface contour of the article to be produced. If properly carried out, such shaping process will provide a relatively smooth and accurate surface contour, and the succeeding steps of the method of the invention may be then applied thereto and an efficient light transmitting, non-specular optical device of image forming type will be provided. If the article is to be of a light diffusing character, the contour shaping step of the method of my invention may be effectively carried out through use of a loose abrasive of the desired grade so that the general contour of the finished surface will conform to the prescribed general contour of the lens or article being produced, but the surface structure of the article will deviate locally from the line of the general contour thereof in the form of minute irregularities. In any case the stock shaping steps of the method of the invention will invariably leave the surface of the stock piece in low transparency form. If simply molded to the final contour, the stock piece will be coated with a mold "film" or minute skin of non-transparent residue which is left thereon as a result of contact with the heated metallic mold. If the shaping process has been accomplished by means of an abrasive cutting or grinding operation, as hereinabove explained, the shaped stock piece will be coated with a residue of finely ground glass particles which are partly fused to the surface of the shaped article and give it a foggy or frosted appearance, as is exemplified by the appearance of common ground glass.

The next step of the method of the invention is to treat the optical surface portion or portions of the stock piece so previously shaped by means of a novel composition of acids and water, and for this purpose I prefer to employ a mixture of phosphoric acid and hydrofluoric acid in water, the phosphoric and hydrofluoric acids being present in the approximate proportions of 5 to 1. The acid mixture is preferably prepared in the form of a bath at an elevated temperature, say about 150° F., and the shaped stock piece is immersed in the bath and agitated therein or alternately removed and rinsed with fresh water and re-dipped in the acid bath until a complete clearing of the shaped surface of the stock piece is obtained. The acid composition of the invention apparently acts upon the surface film of opaque substances of the shaped stock piece in two separate phases of action which carry on simultaneously. The first phase of the action appears to be in the form of an attack by the hydrofluoric acid upon the finely divided fused glass particles which enter into the composition of the surface film to be removed; and the hydrofluoric acid forms, by reason of its attack upon this substance, barium fluorides. The second phase of the said operation involves a reaction between the barium fluorides and the phosphoric acid ingredients of the bath whereby barium phosphate and hydrogen fluoride are formed. The barium phosphate is completely soluble in the water of the bath, and thus no insoluble salts or solids are thrown out by the reactions and the stock piece is left in perfectly clear transparent surface form. The acid composition of the invention, and the handling thereof as described hereinabove, are of such nature that the acid treating step of the invention provides no appreciable chemical reactions upon the stock piece glass per se. This is because the finely divided particles which make up the residual coating of the lens surface subsequent to the shaping operation, hereinabove described, offers relatively little resistance to the action of the chemical bath and is therefore readily removed thereby, whereas the unaltered glass stock offers much greater resistance to the action of the chemical bath and is therefore relatively unaffected when the process is properly controlled as explained hereinabove. Consequently, the finished article conforms accurately to the prescribed optical contour thereof as provided by the initial shaping step or steps of the invention. The finished surface of the article of the invention is of relatively non-specular characteristics, but is of light transmitting ability comparable with that of conventionally polished high-grade optical lenses or the like.

In the form of the invention involving the simultaneous transmission and diffusion of light, the glass stock piece is initially shaped into prescribed surface form by means of a relatively coarse abrasive as hereinabove described. The acid treating step of the invention thereupon clears away all of the light screening surface residues from the cusps of the surface structure and removes all opaque substances from the lens surface at all sides of the cusps and the valleys therebetween. Consequently a minute diffusion of transmitted light is obtained without introduction of light screening effects into the light transmitting system, and thus the invention provides optimum light transmission in combination with minute light diffusion without introducing adverse effects, and as a result of a simple and economically performed manufacturing method.

I am aware that in connection with the glass arts various compositions of acids and/or other chemical reagents have been employed in connection with the polishing of glassware or the like, but the chemical reagents so employed have all been of such character as to be totally unable to clarify the surface structure of barium glass objects, as described hereinabove. For example, I am aware that phosphoric anhydride has previously been employed in connection with glass polishing acid mixtures, but only in very small proportions and as a dehydrating agent only for modification of the reagent bath that produces the polishing of the glass. My invention does not provide a polishing in the sense of the methods referred to, and further distinguishes therefrom in that it employs a preponderance of phosphoric acid and therefore is enabled to provide complete clarification of the barium glass surface residues because of the fact that the barium salts so produced are soluble in the water of the acid bath. Thus, the present invention deals with the special problem presented by the use of barium type glass, and provides a simplified and improved method of clarifying the surface thereof without highly polishing it and in a manner not taught or suggested by the prior art.

It will be understood that the invention is applicable to the production of many kinds of optical devices and/or other barium glass articles requiring maximum surface clarification, and is of particular value in connection with the production of light reflecting devices comprising glass elements in combination with reflecting means. For example, the barium glass stock base may be initially shaped into the form of a lens, and then treated by the acid mixture of the invention and then given a reflective coating at one of the optical surfaces of the lens, so as to provide a mirror or catadioptric device. Also, the invention is applicable to good advantage in connection with the construction of either simple or compound lens devices, and of either image forming or light ray diffusing types, and whenever a high degree of light transmitting capacity is required in combination with optical accuracy.

Although only one form of the invention has been shown and described in detail, it will be apparent to those skilled in the art that the invention is not so limited but that various changes may be made therein without departing from the spirit of the invention or the scope of the appended claims.

I claim:

1. The method of manufacturing a glass light transmitting optical device comprising essentially the steps of shaping a barium containing glass stock piece into the prescribed surface contour thereof, treating said shaped surface by a bath of hydrofluoric and phosphoric acids and water in which the hydrofluoric and phosphoric acid ingredients thereof are present in the approximate proportions of 1 to 5, respectively.

2. The method of manufacturing a glass light transmitting optical device comprising the steps of shaping a barium containing glass stock piece into the prescribed surface contour thereof, treating said shaped surface by a bath containing hydrofluoric and phosphoric acids in which the amount of the phosphoric acid ingredient thereof predominates over the amount of the hydrofluoric acid ingredient.

3. The method of manufacturing a glass light transmitting optical device comprising essentially the steps of shaping a barium containing glass stock piece into the prescribed surface contour thereof, treating said shaped surface by a bath of hydrofluoric and phosphoric acids having a water content in which the phosphoric acid ingredient thereof predominates.

VICTOR WALKER.